US012749439B2

(12) United States Patent
Joo et al.

(10) Patent No.: US 12,749,439 B2
(45) Date of Patent: Sep. 29, 2026

(54) ELECTRONIC DEVICE FOR MINIMIZING STANDBY POWER BASED ON USER USAGE TIME AND CONTROL METHOD THEREOF

(71) Applicant: SAMSUNG ELECTRONICS CO., LTD., Suwon-si (KR)

(72) Inventors: Sungyong Joo, Suwon-si (KR); Shinho Kang, Suwon-si (KR); Jeongwoo Kim, Suwon-si (KR); Sungbum Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/279,697

(22) Filed: Jul. 24, 2025

(65) Prior Publication Data

US 2025/0391347 A1 Dec. 25, 2025

Related U.S. Application Data

(63) Continuation of application No. PCT/KR2025/008489, filed on Jun. 19, 2025.

(30) Foreign Application Priority Data

Jun. 19, 2024 (KR) ........................ 10-2024-0079823

(51) Int. Cl.
*G09G 3/32* (2016.01)
*H04W 52/02* (2009.01)

(52) U.S. Cl.
CPC ............ *G09G 3/32* (2013.01); *H04W 52/027* (2013.01); *H04W 52/0296* (2013.01); *G09G 2330/023* (2013.01); *G09G 2330/026* (2013.01)

(58) Field of Classification Search
CPC ............... G09G 3/32; G09G 2330/023; G09G 2330/026; H04W 52/027; H04W 52/0296
See application file for complete search history.

(56) References Cited

U.S. PATENT DOCUMENTS 7,840,142 B2 11/2010 Keller
9,041,626 B2 * 5/2015 Park .................... G09G 3/3233 345/82

(Continued)

FOREIGN PATENT DOCUMENTS

EP 2 720 143 A1 4/2014
JP 6008557 B2 10/2016

(Continued)

OTHER PUBLICATIONS

International Search Report (PCT/ISA/210) and Written Opinion (PCT/ISA/237) issued on Sep. 23, 2025 by the International Searching Authority in International Patent Application No. PCT/KR2025/008489.

*Primary Examiner* — Lisa S Landis
(74) *Attorney, Agent, or Firm* — Sughrue Mion, PLLC

(57) ABSTRACT

An e-paper display device includes: a main power supply; a sub-power supply; an IR communication module; an RF communication module; a first processor; and a second processor, wherein the first processor is configured to: control the IR communication module and the RF communication module during a general mode of the device, the first processor activated by power supplied by the main power supply, and switch to a low power mode by controlling the sub-power supply to supply power the second processor and controlling the main power supply to stop supply of power to deactivate the first processor and the RF communication module, and the second processor is configured to: control the IR communication module during the low power mode, the second processor activated by power (Continued)

100 supplied by the sub-power supply, and switch to the general mode by controlling supply of power to the first processor and the RF communication module.

20 Claims, 15 Drawing Sheets

(56) References Cited

U.S. PATENT DOCUMENTS

| | | | | |
|---|---|---|---|---|
| 9,063,731 | B2 | 6/2015 | Heo et al. | |
| 10,719,105 | B2 * | 7/2020 | Seo | G06F 1/1618 |
| 12,348,892 | B2 | 7/2025 | Lim | |
| 2011/0084951 | A1 | 4/2011 | Karhuketo et al. | |
| 2013/0113710 | A1 | 5/2013 | Choi et al. | |
| 2014/0059365 | A1 * | 2/2014 | Heo | G06F 1/3215<br>713/320 |
| 2024/0022448 | A1 | 1/2024 | Shintani et al. | |

FOREIGN PATENT DOCUMENTS

| | | | |
|---|---|---|---|
| KR | 10-2007-0039058 | A | 4/2007 |
| KR | 10-2010-0126429 | A | 12/2010 |
| KR | 10-2011-0017949 | A | 2/2011 |
| KR | 10-1203949 | B1 | 11/2012 |
| KR | 10-1255843 | B1 | 4/2013 |
| KR | 10-2013-0051153 | A | 5/2013 |
| KR | 10-1339475 | B1 | 12/2013 |
| KR | 10-2014-0027875 | A | 3/2014 |
| KR | 10-2014-0062809 | A | 5/2014 |
| KR | 10-1544441 | B1 | 8/2015 |
| KR | 10-2016-0005302 | A | 1/2016 |
| KR | 10-2016-0064293 | A | 6/2016 |
| KR | 10-1779477 | B1 | 9/2017 |
| KR | 10-2017-0128651 | A | 11/2017 |
| KR | 10-2018-0049873 | A | 5/2018 |
| KR | 10-2019-0083411 | A | 7/2019 |
| KR | 10-2155608 | B1 | 9/2020 |
| KR | 10-2289731 | B1 | 8/2021 |
| KR | 10-2021-0108219 | A | 9/2021 |
| KR | 10-2022-0130887 | A | 9/2022 |
| KR | 10-2024-0016617 | A | 2/2024 |

* cited by examiner

ELECTRONIC DEVICE FOR MINIMIZING STANDBY POWER BASED ON USER USAGE TIME AND CONTROL METHOD THEREOF

CROSS-REFERENCE TO RELATED APPLICATION(S)

This application is a bypass continuation of International Application No. PCT/KR2025/008489, filed on Jun. 19, 2025, which is based on and claims priority to Korean Patent Application No. 10-2024-0079823, filed on Jun. 19, 2024, in the Korean Intellectual Property Office, the disclosures of which are incorporated by reference herein in their entireties.

BACKGROUND

1. Field

The present disclosure relates to an electronic device and a control method thereof, and more particularly, to an electronic device for minimizing standby power based on user usage time and a control method thereof.

2. Description of Related Art

An electronic device may require very high standby power due to various functions provided by the electronic device and for faster booting, thereby increasing wasted power.

For example, even if a user does not use an Internet of Things (IoT) electronic device, the IoT electronic device activates a radio frequency (RF) communication module to continuously perform RF communication, does not provide a power-saving state to minimize delay that occurs during booting, or the like, and standby power of the electronic device in a home is therefore gradually increasing for these reasons.

There is a need for a device and a method for reducing standby power of the electronic device based on user usage time and by appropriately activating a standby mode without unnecessarily activating all functions and loads.

SUMMARY

According to an aspect of the disclosure, an electronic paper display device includes: a power supply including a main power supply and a sub-power supply; an infrared (IR) communication module; a radio frequency (RF) communication module; a first processor; and a second processor, wherein the first processor is configured to: control the IR communication module and the RF communication module during a general mode of the electronic paper display device, the first processor being activated by receiving power supplied by the main power supply during the general mode, and based on a first condition being satisfied during the general mode, switch the electronic paper display device from the general mode to a low power mode by controlling the power supply to supply power from the sub-power supply to the second processor and controlling the power supply to stop supply of power from the main power supply to deactivate the first processor and the RF communication module, and wherein the second processor is configured to: control the IR communication module during the low power mode, the second processor being activated by receiving power supplied by the sub-power supply during the low power mode, and based on a second condition being satisfied during the low power mode, switch the electronic paper display device from the low power mode to the general mode by controlling the power supply to supply power to the first processor and the RF communication module.

According to an aspect of the disclosure, a method controlling of an electronic paper display device, includes: controlling, by a first processor of the electronic paper display device, an infrared (IR) communication module and a radio frequency (RF) communication module of the electronic paper display device, the first processor being activated by receiving power supplied by a main power supply during a general mode of the electronic paper display device; based on a first condition being satisfied during the general mode, switching, by the first processor, the electronic paper display device from the general mode to a low power mode by controlling a sub-power supply to supply power to a second processor of the electronic paper display device to activate the second processor and controlling the main power supply to stop supply of power from the main power supply to deactivate the first processor and the RF communication module; controlling, by the second processor, the IR communication module during the low power mode, the second processor being activated by receiving power provided from the sub-power supply during the low power mode; and based on a second condition being satisfied during the low power mode, switching, by the second processor, the electronic paper display device from the low power mode to the general mode by supplying power to the first processor and the RF communication module.

According to an aspect of the disclosure, a non-transitory computer-readable recording medium stores a program that executed to perform a method of controlling an electronic paper display device, the method including: controlling, by a first processor of the electronic paper display device, an infrared (IR) communication module and a radio frequency (RF) communication module of the electronic paper display device, the first processor being activated by receiving power supplied by a main power supply during a general mode of the electronic paper display device; based on a first condition being satisfied during the general mode, switching, by the first processor, the electronic paper display device from the general mode to a low power mode by controlling a sub-power supply to supply power to a second processor of the electronic paper display device to activate the second processor and controlling the main power supply to stop supply of power from the main power supply to deactivate the first processor and the RF communication module during the low power mode; controlling, by the second processor, the IR communication module during the low power mode, the second processor being activated by receiving power provided from the sub-power supply during the low power mode; and based on a second condition being satisfied during the low power mode, switching, by the second processor, the electronic paper display device from the low power mode to the general mode by supplying power to the first processor and the RF communication module.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
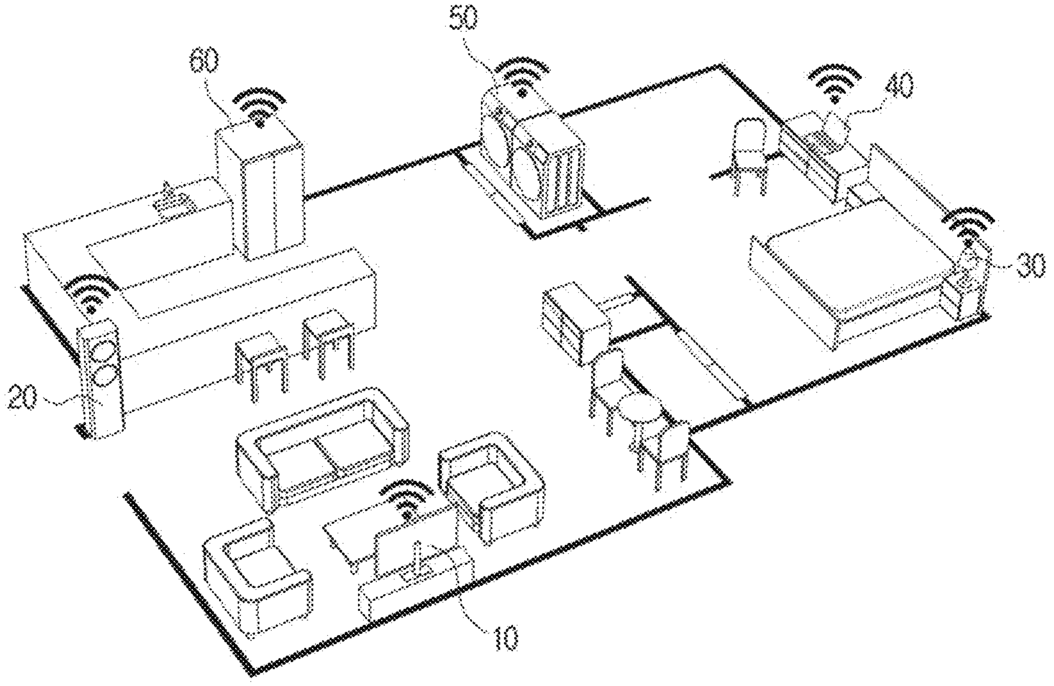
FIG. 1 is a diagram for describing a plurality of electronic devices according to an embodiment of the present disclosure.

Hereinafter, embodiments of the present disclosure is described in detail with reference to the accompanying drawings.

General terms that are currently widely used are selected as terms used in embodiments of the present disclosure in consideration of their functions in the present disclosure, and may be changed based on the intention of those skilled in the art or a judicial precedent, the emergence of a new technique, or the like. In addition, in a specific case, terms arbitrarily chosen by an applicant may exist. In this case, the meanings of such terms are mentioned in detail in corresponding descriptions of the present disclosure. Therefore, the terms used in the present disclosure need to be defined on the basis of the meanings of the terms and the contents throughout the present disclosure rather than simple names of the terms.

In the present disclosure, an expression "have", "may have", "include", "may include" or the like, indicates existence of a corresponding feature (for example, a numerical value, a function, an operation or a component such as a part), and does not exclude existence of an additional feature.

An expression, "at least one of A or B" may indicate "A", "B", or "both of A and B."

Expressions "first", "second" and the like, used in the present disclosure may indicate various components regardless of the sequence or importance of the components. The expression is used only to distinguish one component from another component, and does not limit the corresponding component.

If any component (for example, a first component) is mentioned to be "(operatively or communicatively) coupled with/to" or "connected to" another component (for example, a second component), it should be understood that any component is directly coupled to another component or coupled to another component through still another component (for example, a third component).

A term of a singular number may include its plural number unless explicitly indicated otherwise in the context. It should be understood that a term "include" or "have" used in this application specifies the presence of features, numerals, steps, operations, components, parts, or combinations thereof, which are mentioned in the specification, and does not preclude the presence or addition of one or more other features, numerals, steps, operations, components, parts, or combinations thereof.

In the present disclosure, a "module" or a "~er/~or" may perform at least one function or operation, and be implemented by hardware, software, or a combination of hardware and software. In addition, a plurality of "modules" or a plurality of "~ers/~ors" may be integrated in at least one module and be implemented by at least one processor except for a "module" or a "~er/or" that needs to be implemented by a specific hardware.

In the specification, a term "user" may refer to a person using an electronic device or a device using the electronic device (e.g., artificial intelligence electronic device).

Hereinafter, the embodiments of the present disclosure are described in detail with reference to the accompanying drawings.

FIG. 1 is a diagram for describing a plurality of electronic devices according to an embodiment of the present disclosure.

Referring to FIG. 1, as various types of electronic devices are developed and distributed, a plurality of electronic devices 10, 20, 30, 40, 50, and 60 may be provided in a home.

Each of the plurality of electronic devices 10, 20, 30, 40, 50, and 60 shown in FIG. 1 is an example provided for convenience of description, and each of the plurality of electronic devices 10, 20, 30, 40, 50, and 60 may be implemented as any of various types of home appliances, such as an air conditioning device, a kitchen/cooking device, a wired/wireless cleaning device, an image processing device, or a clothing care device.

For example, each of the plurality of electronic devices 10, 20, 30, 40, 50, and 60 may include at least one of a television (TV), a user terminal device, a tablet personal computer (PC), an electronic paper display (e-paper display) device, a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, a virtual reality (VR) implementation device, or a wearable device. Here, the wearable device may include at least one of an accessory-type wearable device (for example, a watch, a ring, a bracelet, an anklet, a necklace, glasses, contact lenses, or a head-mounted device (HMD)), a textile or clothing-integrated wearable device (for example, an electronic clothing), a body-attached wearable device (for example, a skin pad or a tattoo), or a biologically implantable circuit. In some embodiments, each of the plurality of electronic devices 10, 20, 30, 40, 50, and 60 may include at least one of a television, a digital video disk (DVD) player, an audio system, a refrigerator, an air conditioner, a vacuum cleaner, an oven, a microwave oven, a washing machine, an air purifier, a source device (e.g., a set-top box, a cloud server, or an over-the-top media (OTT) service server), a home automation control panel, a security control panel, a media box (e.g., Samsung HomeSync™, AppleTV™, or Google TV™), a game console (e.g., Xbox™, PlayStation™, or Switch™), an electronic dictionary, an electronic key, a camcorder, or an electronic picture frame.

In another embodiment, each of the plurality of electronic devices 10, 20, 30, 40, 50, and 60 may include at least one of various medical devices (e.g., various portable medical measuring devices (such as a blood glucose monitor, a heart rate monitor, a blood pressure monitor or a body temperature monitor), a magnetic resonance angiography (MRA), a magnetic resonance imaging (MRI), a computed tomography (CT), a camera or an ultrasonicator)), a navigation device, a global positioning system (i.e., global navigation satellite system (GNSS)), an event data recorder (EDR), a flight data recorder (FDR), an automotive infotainment device, marine electronic equipment (e.g., a marine navigation system or a gyro compass), an avionics, a security device, a vehicle head unit, an industrial or home robot, a drone, an automated teller machine (ATM) in a financial institution, a point of sales (POS) in a store or an internet of things device (e.g., a light bulb, various sensors, a sprinkler device, a fire alarm, a thermostat, a street light, a toaster, fitness equipment, a hot water tank, a heater or a boiler).

According to an embodiment, each of the plurality of electronic devices 10, 20, 30, 40, 50, and 60 may be implemented as an Internet of Things (IoT) device and may communicate with another electronic device, the user terminal device, a remote control device, the server, or the like installed in the home. For example, each of the plurality of electronic devices 10, 20, 30, 40, 50, and 60 may include a radio frequency (RF) communication module to transmit and receive RF signals.

According to an embodiment, power waste may occur due to relatively high standby power if each of the plurality of electronic devices 10, 20, 30, 40, 50, and 60 includes the RF communication module activated to transmit and receive the RF signals. For example, standby power of each of the plurality of electronic devices 10, 20, 30, 40, 50, and 60 including the activated RF communication module is as shown in Table 1 below.

TABLE 1

| Category | Quantity | Standby Power (W) | Standby Time (h) | Standby Energy Consumption (Wh) | Usage Time (h) |
|---|---|---|---|---|---|
| Television | 2 | 1.3 | 17.1 | 44.5 | 6.9 |
| Set-top box | 2 | 12.2 | 17.5 | 427.0 | 6.5 |
| Stand lamp | 1 | 0.6 | 22.8 | 13.7 | 1.2 |
| Computer | 1 | 2.6 | 19.9 | 103.5 | 4.1 |
| Internet modem | 1 | 6.0 | 20.2 | 121.2 | 3.8 |

TABLE 1-continued

| Category | Quantity | Standby Power (W) | Standby Time (h) | Standby Energy Consumption (Wh) | Usage Time (h) |
|---|---|---|---|---|---|
| Internet phone | 2 | 0.2 | 24.0 | 9.6 | 0.0 |
| Video Cassette Recorder | 1 | 4.9 | 17.3 | 84.6 | 6.7 |
| DVD Player | 1 | 3.7 | 18.6 | 68.9 | 5.4 |
| Printer | 1 | 2.6 | 15.5 | 40.2 | 8.5 |
| Home theater system | 1 | 5.1 | 18.6 | 94.9 | 5.4 |
| Air conditioner | 1 | 5.8 | 20.1 | 116.6 | 3.9 |
| Electric fan | 2 | 0.2 | 18.2 | 7.3 | 5.8 |
| Microwave oven | 1 | 2.2 | 23.9 | 52.6 | 0.1 |
| Mobile phone charger | 1 | 0.3 | 13.8 | 16.6 | 10.2 |
| Air purifier | 1 | 0.3 | 18.9 | 5.7 | 5.1 |
| Dishwasher | 1 | 1.0 | 23.6 | 23.6 | 0.4 |
| Total | | 49.0 | 1230.5 | | |

For example, each of the plurality of electronic devices 10, 20, 30, 40, 50, and 60 may continuously activate the RF communication module in addition to the user usage time (i.e., a time required to transmit and receive the RF signals), thereby unnecessarily wasting approximately 1230.5 Wh of power during a day. According to an embodiment of the present disclosure, each of the plurality of electronic devices 10, 20, 30, 40, 50, and 60 may activate or deactivate the RF communication module based on the user usage time, thereby minimizing unnecessarily wasted power.

According to various embodiments of the present disclosure, the IoT device may minimize standby power by dynamically activating the RF communication module based on the user usage time.

Hereinafter, for the convenience of description, any one of the plurality of electronic devices 10, 20, 30, 40, 50, and 60 is assumed as an electronic device 100.

Figure 2:
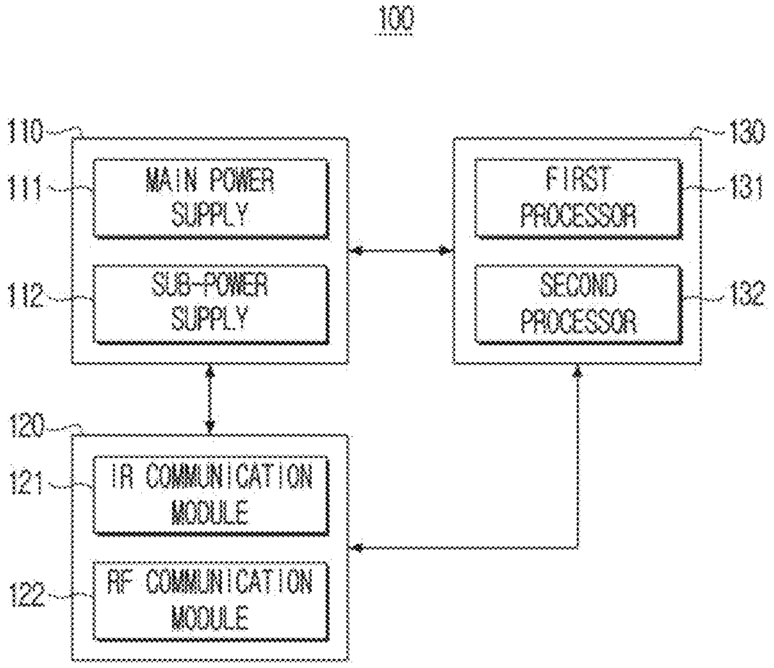
FIG. 2 is a block diagram showing a configuration of the electronic device according to an embodiment of the present disclosure.

FIG. 2 is a block diagram showing a configuration of the electronic device according to an embodiment of the present disclosure.

As shown in FIG. 2, the electronic device 100 may include a power supply 110, a communication interface 120, and a processor 130.

According to an embodiment, the power supply 110 may include a main power supply 111 and a sub-power supply 112.

According to an embodiment, the main power supply 111 refers to a hardware connected to a power outlet that provides commercial power (e.g., 90 to 264 V) and converts alternating current (AC) power into direct current (DC) power to stably supply power to an internal load of the electronic device 100 (or an external device connected to the electronic device 100).

According to an embodiment of the present disclosure, the main power supply 111 may include a diode bridge (or bridge rectifier), an electromagnetic interference (EMI) filter, an alternating current to direct current (AC/DC) block, and a direct current to direct current (DC/DC) block.

According to an embodiment, the main power supply 111 may provide power to a first processor 131 included in the processor 130 during a general or normal mode of the electronic device 100 that corresponds to the user usage time, and the first processor 131 may control an infrared (IR) communication module 121 and a radio frequency (RF) communication module 122.

For example, the first processor 131 may identify the user usage time based on a user setting or usage history information of the electronic device 100, and may identify a time or time period associated with the general mode of the electronic device 100 or a time or time period associated with a low power mode of the electronic device 100, based on the user usage time.

According to an embodiment, the first processor 131 may transmit at least one of the time associated with the general mode or the time associated with the low power mode to a second processor 132. According to an embodiment, the second processor 132 may control the power supply 110 to provide power from the main power supply 111 to the first processor 131 if the time associated with the general mode arrives (or if the time associated with the low power mode elapses) while the electronic device 100 is operated in the low power mode.

The first processor 131 may be activated using power provided from the main power supply 111 and may control the IR communication module 121 and the RF communication module 122 to operate the electronic device 100 in the general mode.

According to an embodiment, the first processor 131 may control the power supply 110 to provide power from the sub-power supply 112 to the second processor 132 if the time associated with the low power mode arrives (or the time associated with the general mode elapses) while the electronic device 100 is operated in the general mode.

The second processor 132 may be activated using power provided from the sub-power supply 112 and may control the IR communication module 121 to operate the electronic device 100 in the low power mode.

According to an embodiment, the communication interface 120 may include the IR communication module 121 and the RF communication module 122.

According to an embodiment, the RF communication module 122 may include any of various interfaces such as an application processor (AP)-based wireless fidelity (Wi-Fi, wireless local area network (LAN)), a Bluetooth communication module, a Bluetooth low energy (BLE) communication module, a third generation (3G) mobile communication module, a long term evolution (LTE) communication module, a fifth generation (5G) mobile communication module, a sixth generation (6G) mobile communication module, an Ad-Hoc network-based Wi-Fi Direct communication module, an LTE Direct communication module, a Zigbee communication module, and a Near Field Communication (NFC) communication module.

However, the communication interface 120 is not limited thereto, and may include a wired interface (or a wired terminal) according to various standards. For example, the communication interface 120 may include various interfaces such as a high definition multimedia interface (HDMI), a mobile high-definition link (MHL), a universal serial bus (USB), a display port (DP), a Thunderbolt port, a video graphics array (VGA) port, a red-green-blue (RGB) port, a D-subminiature (D-SUB) port, a digital visual interface (DVI) port, a wired local area network (LAN), a wide area network (WAN), Ethernet, an Institute of Electrical and Electronics Engineers 1394 (IEEE 1394), Audio engineering society/European broadcasting union (AES/EBU), an optical communication, or a coaxial cable.

According to an embodiment, the processor 130 may control overall operations of the electronic device 100. In detail, the processor 130 may be connected to each component of the electronic device 100 and control the overall operations of the electronic device 100.

The processor 130 may perform the operations of the electronic device 100 according to the various embodiments by executing at least one instruction stored in a memory.

According to an embodiment, the processor 130 may be implemented as a digital signal processor (DSP), a microprocessor, or a timing controller (TCON) that processes a digital signal. However, the processor 130 is not limited thereto, and may include at least one of a central processing unit (CPU), a micro controller unit (MCU), a micro processing unit (MPU), a controller, an application processor (AP), a communication processor (CP), an ARM processor, an artificial intelligence (AI) processor, or may be defined by a relevant term. In addition, the processor 130 may be implemented as a system-on-chip (SoC) or a large scale integration (LSI) that has a processing algorithm embedded therein, or may be implemented in the form of a field programmable gate array (FPGA). The processor 130 may perform various functions by executing computer executable instructions stored in the memory.

The processor 130 may include at least one of a central processing unit (CPU), a graphic processing unit (GPU), an accelerated processing unit (APU), a many integrated core (MIC), a digital signal processor (DSP), a neural processing unit (NPU), a hardware accelerator, or a machine learning accelerator. The processor 130 may control one or any combination of other components included in the electronic device, and may perform operations related to communication or data processing. The processor 130 may execute at least one program or instruction stored in the memory. For example, the processor 130 may perform a method according to an embodiment of the present disclosure by executing at least one instruction stored in the memory.

If the method according to an embodiment of the present disclosure includes a plurality of operations, the plurality of operations may be performed by one processor, or may be performed by a plurality of processors. For example, if a first operation, a second operation, and a third operation are performed by the method according to an embodiment, the first operation, the second operation, and the third operation may all be performed by the first processor. Alternatively, the first operation and the second operation may be performed by the first processor (for example, a general-purpose processor), and the third operation may be performed by the second processor (for example, an artificial intelligence-only processor).

The processor 130 may be implemented as a single-core processor including a single core, or may be implemented as at least one multi-core processor including multi-cores (for example, homogeneous multi-cores or heterogeneous multi-cores). If the processor 130 is implemented as the multi-core processor, each of the multi-cores included in the multi-core processor may include a processor internal memory such as a cache memory or an on-chip memory, and a common cache shared by the multi-cores may be included in the multi-core processor. In addition, each (or some) of the multi-cores included in the multi-core processor may independently read and perform a program instruction for implementing the method according to an embodiment of the present disclosure, or all (or some) of the multi-cores may be linked with each other to read and perform the program instruction for implementing the method according to an embodiment of the present disclosure.

If the method according to an embodiment of the present disclosure includes the plurality of operations, the plurality of operations may be performed by the single core among the multi-cores included in the multi-core processor, or may be performed by the multi-cores. For example, if the first operation, the second operation, and the third operation are performed using the method according to an embodiment, the first operation, the second operation, and the third operation may all be performed by a first core included in the multi-core processor. Alternatively, the first operation and the second operation may be performed by the first core included in the multi-core processor, and the third operation may be performed by a second core included in the multi-core processor.

In the embodiments of the present disclosure, the processor may indicate a system-on-chip (SoC) in which the processor and other electronic components are integrated with each other, the single-core processor, the multi-core processor, or the core included in the single-core processor or the multi-core processor. Here, the core may be implemented as the CPU, the GPU, the APU, the MIC, the DSP, the NPU, the hardware accelerator, the machine learning accelerator, or the like. However, the embodiments of the present disclosure are not limited thereto.

According to an embodiment, the processor 130 may include the first processor 131 and the second processor 132.

According to an embodiment, the first processor 131 may be activated during the general mode of the electronic device 100 and may control all functions of the electronic device 100, including the IR communication module 121 and the RF communication module 122 included in the communication interface 120.

For example, the first processor 131 may be a high-performance processor that consumes relatively high power and may control each component of the electronic device 100, and thus also be referred to as a main processor. However, for the convenience of description, the high-performance processor is collectively referred to as the first processor 131 below.

According to an embodiment, the second processor 132 may be activated during the low power mode of the electronic device 100 and may control some functions of the electronic device 100, including the IR communication module 121 included in the communication interface 120. According to an embodiment, the second processor 132 may be activated on its own (or by itself) by power provided from the sub-power supply 112 if the time associated with the low power mode arrives, and may control some functions of the electronic device 100, including the IR communication module 121 included in the communication interface 120.

According to an embodiment, the second processor 132 may control the power supply 110 to provide power from the main power supply 111 to the first processor 131 and to block the supply of power from the sub-power supply 112 to the second processor 132 if the time associated with the low power mode elapses (or if the time associated with the general mode arrives). According to an embodiment, the second processor 132 may control the power supply 110 to provide power from the main power supply 111 to the first processor 131, thereby activating the first processor 131.

For example, the second processor 132 may switch the electronic device 100 to the general mode by controlling the power supply 110 to activate the DC/DC block included in the main power supply 111, thereby providing power from the main power supply 111 to the first processor 131 and blocking the supply of power from the sub-power supply 112 to the second processor 132 if the time associated with the low power mode elapses.

For example, the second processor 132 may be a low-power processor (e.g., a microcontroller or a microcontroller unit (MCU)) that consumes relatively low power, and may be referred to as a sub-processor. However, for the convenience of description, the low-power processor is collectively referred to as the second processor 132 below.

Figure 3:
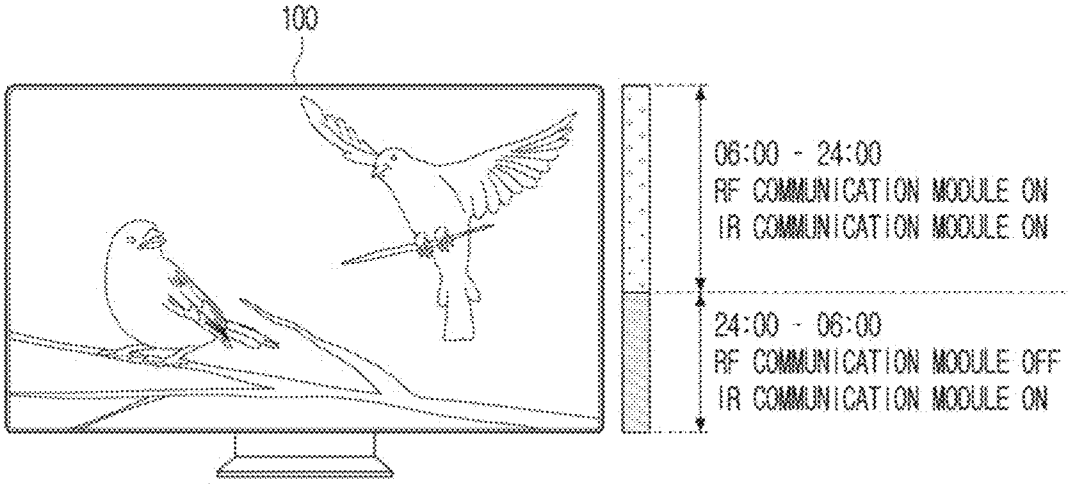
FIG. 3 is a diagram for describing the electronic device operated in a general mode or a low power mode based on user usage time according to an embodiment of the present disclosure.

FIG. 3 is a diagram for describing the electronic device operated in the general mode or the low power mode based on user usage time according to an embodiment of the present disclosure.

According to an embodiment, the first processor 131 may obtain time information based on the user setting, or obtain the time information by inputting the usage history information of the electronic device 100 into a neural network model. For example, the first processor 131 may obtain a time for starting the low power mode (or a time for ending the general mode) and a time for ending the low power mode (or a time for starting the general mode) as the time information based on the user setting.

For example, the first processor 131 may input the usage history information of the user for the electronic device 100 into the neural network model to obtain the time for starting the low power mode (or the time for ending the general mode) and the time for ending the low power mode (or the time for starting the general mode) as the time information.

According to an embodiment, the neural network model may be a model trained to output the time information including the time associated with the low power mode (e.g., the time for starting the low power mode and the time for ending the low power mode) based on the usage time of the electronic device 100, included in the usage history information if the usage history information is input.

According to an embodiment, the first processor 131 may be activated using power provided from the main power supply 111 during the time associated with the general mode (e.g., 06:00 to 24:00) and may activate the IR communication module 121 and the RF communication module 122.

In an embodiment, the first processor 131 may control the power supply 110 to provide power from the sub-power supply 112 to the second processor 132 and to block the supply of power from the main power supply 111 to the first processor 131 if the time associated with the general mode elapses (e.g., 24:00) (or if the time associated with the low power mode arrives). In an embodiment, the first processor 131 may transmit the time information including the time associated with the low power mode to the second processor 132 if the time associated with the general mode elapses.

According to an embodiment, the second processor 132 may be activated using power provided from the sub-power supply 112 during the time associated with the low power mode (e.g., 24:00 to 06:00) based on the time information, and activate the IR communication module 121. During the low power mode, the RF communication module 122 may be deactivated, thereby minimizing standby power of the electronic device 100 during the time associated with the low power mode without unnecessarily wasting power.

According to an embodiment, the second processor 132 may control the power supply 110 to provide power from the main power supply 111 to the first processor 131 and to block the supply of power from the sub-power supply 112 to the second processor 132 if the time associated with the low power mode elapses (e.g., 06:00) (or if the time associated with the general mode arrives), based on the time information.

For the convenience of description, in FIG. 3, the time associated with the low power mode is assumed to be a user bedtime (e.g., 24:00 to 06:00), and the time associated with the general mode is assumed to be a user activity time (e.g., 06:00 to 24:00), which is an example for the convenience of description and is not limited thereto.

For example, the first processor 131 may identify a user home absence time (e.g., work time, 08:00 to 18:00) as the time associated with the low power mode based on the user setting or the usage history information, and may identify a user home presence time (e.g., 18:00 to 08:00 of the next day) as the time associated with the general mode.

In addition, the first processor 131 may also further distinguish the time associated with the low power mode from the time associated with the general mode. For example, the first processor 131 may identify 24:00 to 06:00 of a 24-hour day as the time associated with the low power mode, 06:00 to 12:00 as the time associated with the general mode, 12:00 to 18:00 as the time associated with the low power mode, and 18:00 to 24:00 as the time associated with the general mode.

Figure 4A:
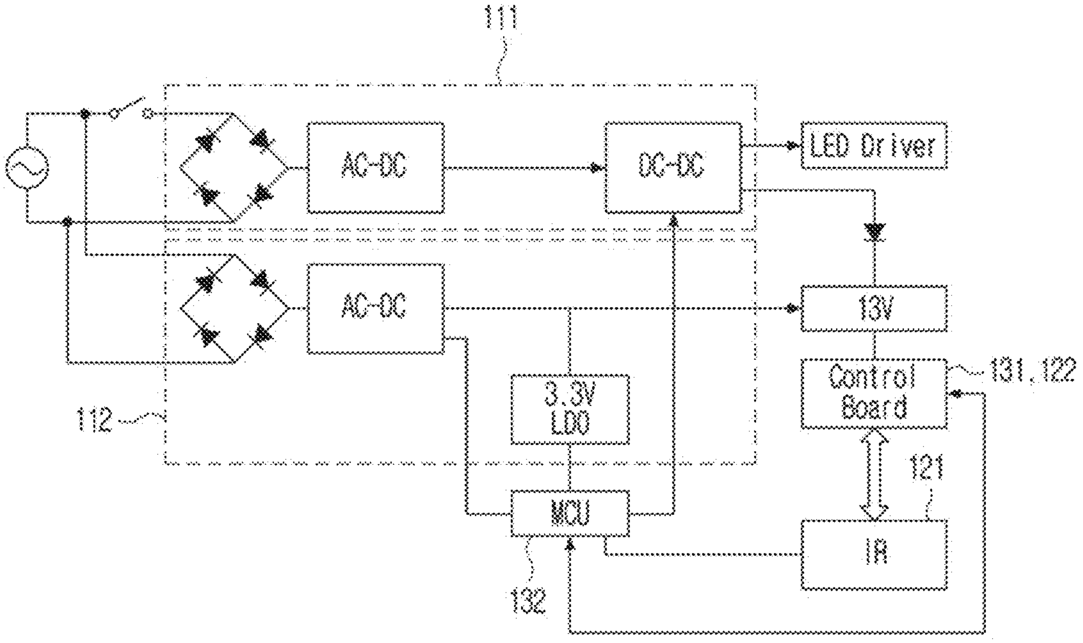
FIG. 4A is a diagram for describing a power supply and processors included in the electronic device according to an embodiment of the present disclosure.

FIG. 4A is a diagram for describing the power supply and the processors included in the electronic device according to an embodiment of the present disclosure.

Referring to FIG. 4A, each of the main power supply 111 and the sub-power supply 112, included in the power supply 110, may be connected to the power outlet that provides commercial power (e.g., 90 to 264 V).

According to an embodiment, the main power supply 111 may convert AC power into DC power by rectifying and smoothing AC power through the AC/DC block (e.g., an AC/DC converter).

According to an embodiment, the main power supply 111 may convert rectified power to a predetermined intensity by using the DC/DC block (e.g., a DC/DC converter) connected to the AC/DC block.

According to an embodiment, the DC/DC block may provide power to the load (e.g., to light-emitting elements of a display, a light-emitting diode (LED) driver, or the like if the electronic device 100 includes the display). For example, the DC/DC block may provide 13 V to a control board that includes the first processor 131 and the RF communication module 122, and the first processor 131 and the RF communication module 122 may be activated using power provided from the main power supply 111. In addition, the IR communication module 121 may also be activated using power provided from the main power supply 111.

According to an embodiment, the first processor 131 may control the power supply 110 to provide power from the sub-power supply 112 to the second processor 132 and to block the supply of power from the main power supply 111 to the first processor 131 if a predetermined condition related entering the low power mode is satisfied, e.g., the time associated with the low power mode arrives or a time period related to the general mode elapses, thereby switching the electronic device 100 to the low power mode.

According to an embodiment, the sub-power supply 112 may convert AC power into DC power by rectifying and smoothing AC power by using the AC/DC block (e.g., the AC/DC converter). According to an embodiment, the sub-power supply 112 may include a voltage regulator. According to an embodiment, the voltage regulator may include a linear regulator and may be implemented as, for example, a 3.3 V-low dropout (LDO) regulator.

For example, the 3.3 V-LDO regulator included in the sub-power supply 112 may provide 3.3 V to the second processor 132, and the second processor 132 may be activated using power provided from the sub-power supply 112. In addition, the IR communication module 121 may also be activated using power provided from the sub-power supply 112.

According to an embodiment, if a condition related to entering the general mode is satisfied, e.g., a time period associated with the low power mode elapses or a time associated with the general mode arrives, the second processor 132 may control the power supply 110 to activate the DC/DC block included in the main power supply 111 to provide power from the main power supply 111 to the first processor 131 and to block the supply of power from the sub-power supply 112 to the second processor 132, thereby switching the electronic device 100 to the general mode.

Figure 4B:
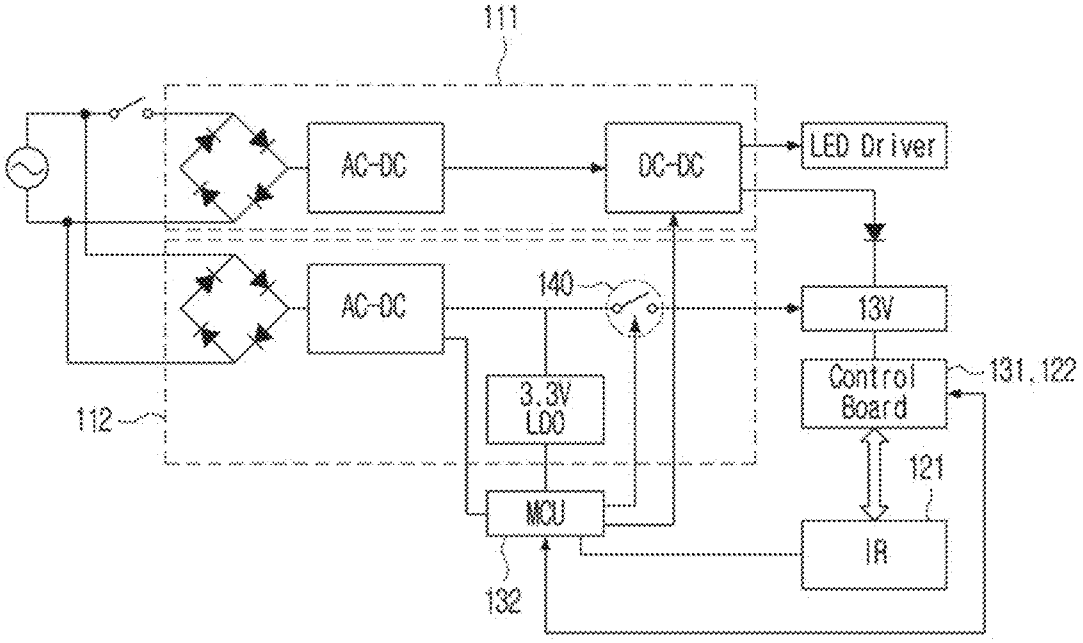
FIG. 4B is a diagram for describing the power supply and the processor included in the electronic device including a switch according to an embodiment of the present disclosure.

FIG. 4B is a diagram for describing the power supply and the processor included in the electronic device including a switch according to an embodiment of the present disclosure.

For example, even if the time associated with the low power mode elapses, the user may not use the electronic device 100, and power may be unnecessarily wasted if all the functions and loads (e.g., the LED Driver) of the electronic device 100 are activated while the electronic device 100 is not in use.

Referring to FIG. 4B, the power supply 110 may include a switch 140. According to an embodiment, if the time associated with the low power mode elapses, the second processor 132 may not activate the DC/DC block, and turn on the switch 140 to control the power supply 110 to provide power from the sub-power supply 112 to the control board.

For example, the second processor 132 may turn on the switch 140 to control the power supply 110, thereby providing power at 13 V from the sub-power supply 112 to the control board instead of activating the DC/DC block to provide power from the main power supply 111 to all the loads of the electronic device 100, even if the time associated with the low power mode elapses.

According to an embodiment, if the time associated with the low power mode elapses and the switch 140 is then turned on to provide power at 13 V from the sub-power supply 112 to the control board, the first processor 131 and the RF communication module 122 included in the control board may be activated although not all the loads of the electronic device 100 are activated. Accordingly, the electronic device 100 may transmit and receive the RF signals.

According to an embodiment, the second processor 132 may turn on the switch 140 to provide power from the sub-power supply 112 to the control board for a predetermined time (e.g., 2 hours) after the time associated with the low power mode elapses, and may turn off the switch 140 and activate the DC/DC block to provide power from the main power supply 111 to the control board if the predetermined time elapses.

According to an embodiment, the second processor 132 may activate the DC/DC block to thus activate all the loads of the electronic device 100 if a control command is received from the remote control device via the IR communication module 121, if the control command is received from the user terminal device (or a server 200 or the like) via the RF communication module 122, or if the predetermined time elapses.

Figure 5A:
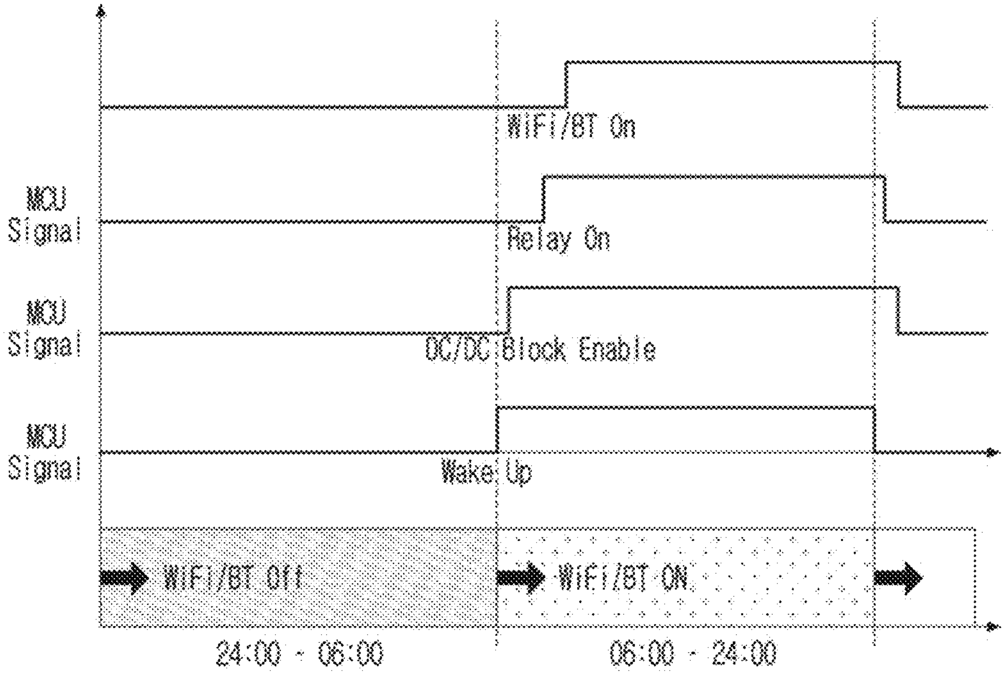
FIG. 5A is a graph for describing the electronic device switched from the low power mode to the general mode according to an embodiment of the present disclosure.

FIG. 5A is a graph for describing the electronic device switched from the low power mode to the general mode according to an embodiment of the present disclosure.

Referring to FIG. 5A, the electronic device 100 may be operated in the low power mode before the time associated with the low power mode elapses, and if the time associated with the low power mode elapses, the second processor 132 may transmit a wakeup signal to the DC/DC block based on the time information to activate the DC/DC block.

According to an embodiment, if the DC/DC block is activated and the relay switch is turned on, the DC/DC block may provide 13 V to the control board, and the first processor 131 and the RF communication module 122, included in the control board, may be activated using power provided from the main power supply 111, thereby operating the electronic device 100 in the general mode.

According to an embodiment, the second processor 132 may control the power supply 110 to provide power from the main power supply 111 to the first processor 131 if the control command is received via the IR communication module 121 during the low power mode of the electronic device 100. The control command may include various types of signals for activating (or turning on) the electronic device 100.

For example, the second processor 132 may control the power supply 110 to activate the DC/DC block if the control command output from the remote control device is received via the IR communication module 121 to provide power from the main power supply 111 to the control board including the first processor 131 and the RF communication module 122.

Figure 5B:
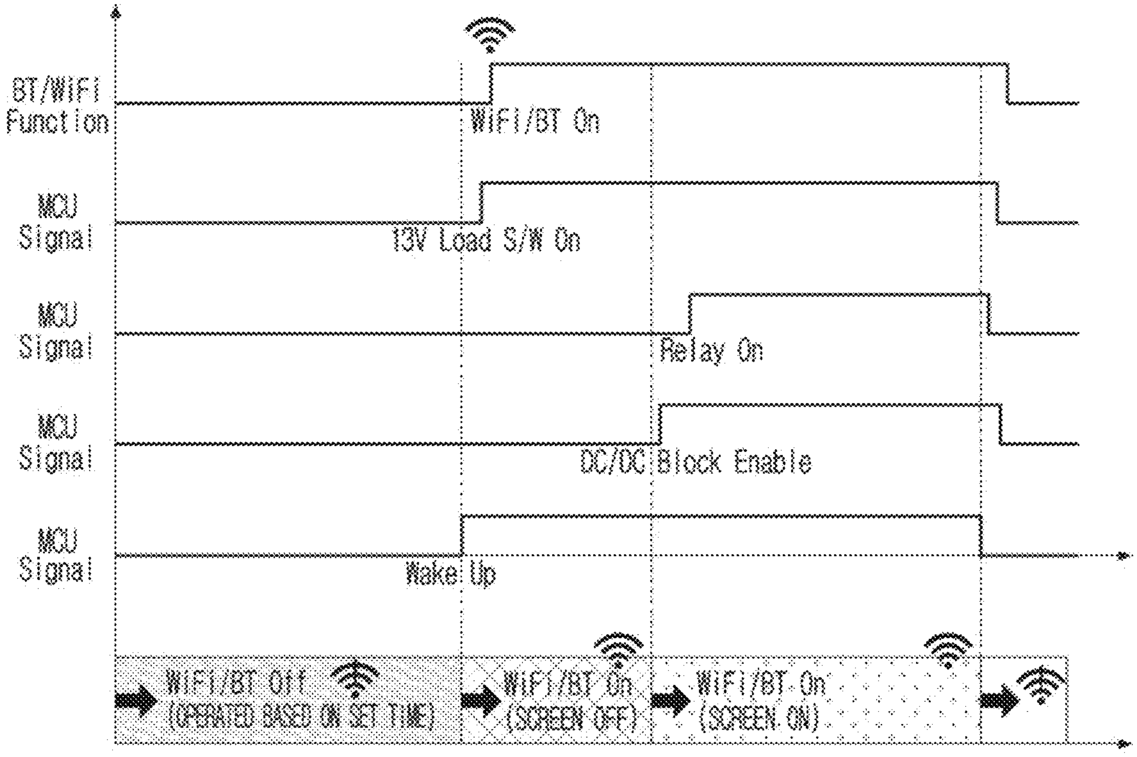
FIG. 5B is a graph for describing the electronic device switched from the low power mode to the general mode according to an embodiment of the present disclosure.

FIG. 5B is a graph for describing the electronic device switched from the low power mode to the general mode according to an embodiment of the present disclosure.

Referring to the circuit diagram in FIG. 4B and the graph in FIG. 5B, if the time associated with the low power mode elapses, the DC/DC block may not be activated immediately, and the second processor 132 may turn on the switch 140 to control the power supply 110 to provide power from the sub-power supply 112 to the control board.

According to an embodiment, if the time associated with the low power mode elapses and the switch 140 is then turned on to provide power at 13 V from the sub-power supply 112 to the control board, the first processor 131 and the RF communication module 122 included in the control board may be activated even though not all the loads of the electronic device 100 are activated, such as the screen of the electronic device 100 being turned off. Accordingly, the electronic device 100 may transmit and receive the RF signals (e.g., Wi-Fi signals or Bluetooth (BT) signals).

According to an embodiment, the second processor 132 may turn on the switch 140 to provide power from the sub-power supply 112 to the control board for the predetermined time (e.g., 2 hours) after the time associated with the low power mode elapses, and may activate the DC/DC block if the predetermined time elapses.

According to an embodiment, if the DC/DC block is activated and the relay switch is turned on, the second processor 132 may use power provided from the main power supply 111 to activate all the loads of the electronic device 100. Therefore, the electronic device 100 may be operated in the general mode.

According to an embodiment, the first processor 131 may be activated using power provided from the main power supply 111 in the general mode during the time associated with the general mode to thus activate all the loads of the electronic device 100 (e.g., turning on the screen), and may switch the electronic device to the low power mode by controlling the power supply 110 if the time associated with the general mode elapses.

Figure 6:
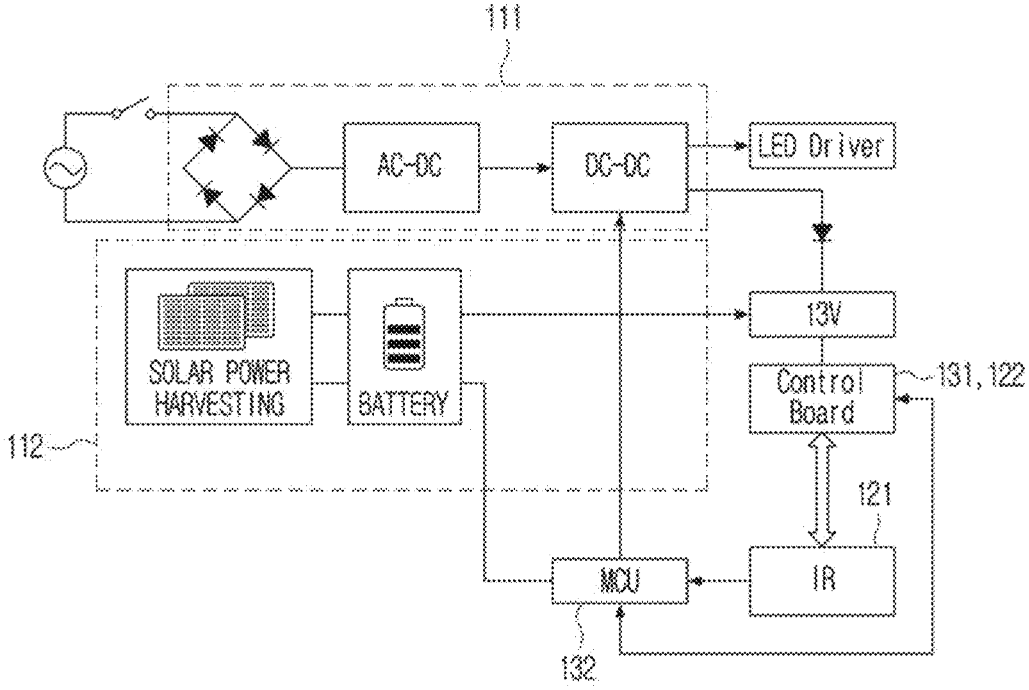
FIG. 6 is a graph for describing a sub-power supply including a battery charged using solar power or another method according to an embodiment of the present disclosure.

FIG. 6 is a graph for describing the sub-power supply including a battery charged using solar power or another method according to an embodiment of the present disclosure.

Figure 7:
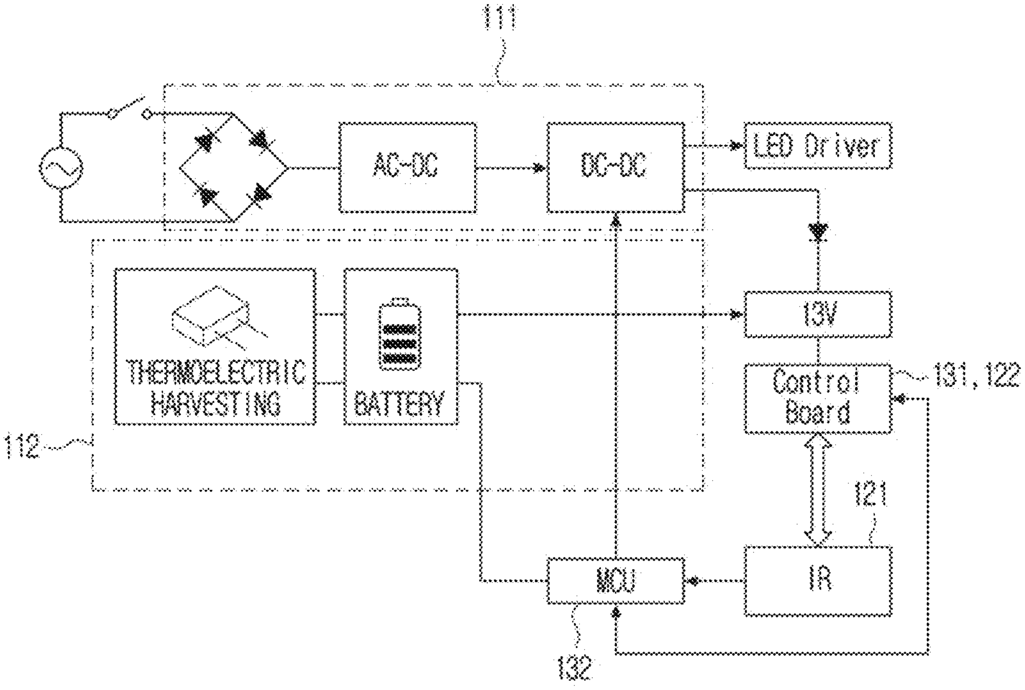
FIG. 7 is a graph for describing the sub-power supply including a battery charged by thermoelectric harvesting according to an embodiment of the present disclosure.

As shown in FIG. 4, the sub-power supply 112 may be connected to the power outlet that provides commercial power (e.g., 90 to 264 V), and, as shown in FIG. 7, may be implemented to include the battery and a charging/discharging circuit that controls charging/discharging of the battery rather than including the AC/DC block.

According to an embodiment, the sub-power supply 112 may include a solar power harvesting diode that collects energy using sunlight, and the solar power harvesting diode (e.g., a solar cell) may include a photovoltaic element. According to an embodiment, the solar power harvesting diode may harvest energy by using a photovoltaic effect.

According to an embodiment, the charging/discharging circuit may provide charging power to the battery to charge the battery with energy collected using the solar power harvesting diode.

In addition, the charging/discharging circuit may control the battery to output (or discharge) power stored in the battery.

For example, the charging/discharging circuit may provide a constant current (CC) to the battery under control of the second processor 132, and if an internal voltage of the battery continuously increases and reaches a reference value, the internal voltage of the battery may be switched to a constant voltage (CV) to prevent overvoltage, and an amount of current provided to the battery may be continuously reduced to complete the charging of the battery. A charging method of the charging/discharging circuit for the battery is not limited to the above-described CC/CV charging method, and the battery may be charged using various charging methods.

According to an embodiment, the second processor 132 may control the charging/discharging circuit based on the time information to prevent battery overcurrent and to output the constant current (CC) from the battery during the time associated with the low power mode. According to an embodiment, the second processor 132 and the IR communication module 121 may be activated using power output by the battery. Therefore, the electronic device 100 may be operated in the low power mode.

However, the charging/discharging circuit may also charge the battery by using power provided from the main power supply 111 during the general mode of the electronic device 100 in addition to the energy harvested by the solar power harvesting diode shown in FIG. 6.

According to an embodiment, the second processor 132 may control the power supply 110 to provide power from the main power supply 111 to the second processor 132 if the remaining power of the battery is less than a threshold power.

For example, if the electronic device 100 uses 100 W of power per hour, the voltage of the battery is 12 V and a battery capacity is 10 Ah, the battery may provide 120 W of power, and the electronic device 100 may therefore be operated for 1.2 hours. According to an embodiment, the second processor 132 may also control the power supply 110 to provide power from the main power supply 111 to the second processor 132 if the remaining power of the battery is less than 20% of a total capacity (e.g., the remaining power is 24 W).

However, the power consumption of the electronic device 100 per hour, the voltage and capacity of the battery may vary, and the second processor 132 may control the power supply 110 to provide power from the main power supply 111 to the second processor 132 under various conditions, such as a case where the remaining power of the battery is less than 10% (or less than 5%) of the total capacity.

For example, if the battery outputs a certain amount of power (i.e., discharges power), the battery may complete discharging if the internal voltage of the battery drops below a threshold voltage.

According to an embodiment, the second processor 132 may control the power supply 110 to provide power from the main power supply 111 to the second processor 132 to continuously activate the second processor 132 and the IR communication module 121 even if the battery is discharged during the low power mode.

FIG. 7 is a graph for describing the sub-power supply including a battery charged by thermoelectric harvesting according to an embodiment of the present disclosure.

According to an embodiment, the sub-power supply 112 may include a thermoelectric harvesting diode that harvests energy by using heat generated during the operation of the electronic device 100, and the thermoelectric harvesting diode may harvest energy by using a thermoelectric effect.

For example, the thermoelectric harvesting diode may convert a temperature difference in the electronic device 100 into a potential difference, and electrons in a high-temperature object may have higher kinetic energy than electrons in a low-temperature object, and the potential difference that occurs if the two objects are connected to each other and the electrons in a high-temperature region spread to a low-temperature region may be used to generate electricity and charge the battery.

Descriptions of an embodiment in which the battery is charged or discharged using the charging/discharging circuit, an embodiment in which the battery is charged using power provided from the main power supply 111, and an embodiment in which the main power supply 111 provides power to the second processor 132 if the battery is below the threshold power are redundant with the description provided with reference to FIG. 6, and are thus omitted.

FIGS. 6 and 7 assume and show embodiments in which the battery is charged with energy harvested using solar power and heat, and the present disclosure is not limited thereto.

For example, the charging/discharging circuit included in the sub-power supply 112 may charge the battery by using vibration, wind, or the like as an energy source, and provide power charged in the battery to the second processor 132 during the time associated with the low power mode to operate the electronic device 100 in the low power mode.

Figure 8:
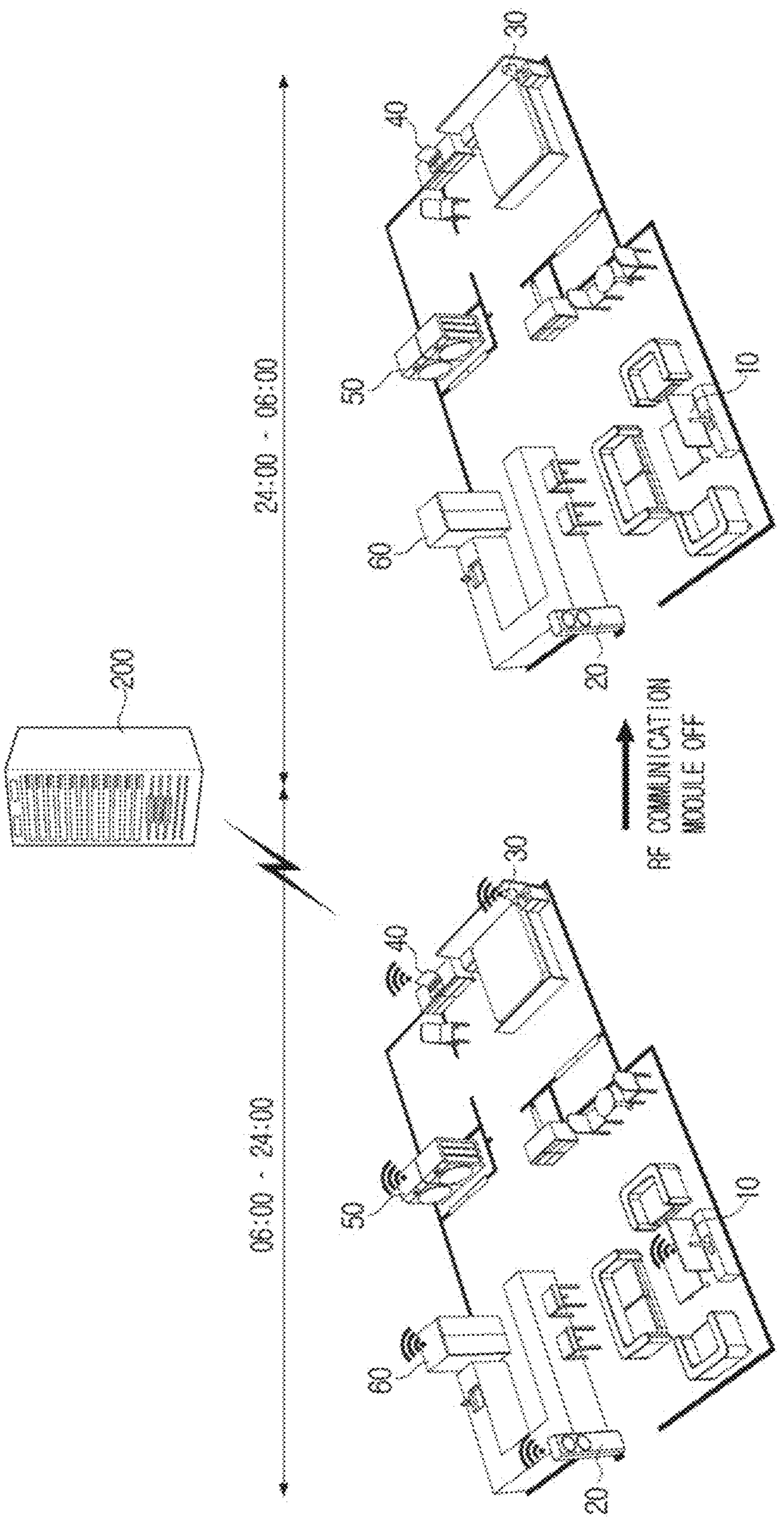
FIG. 8 is a diagram for describing the plurality of electronic devices communicating with a server according to an embodiment of the present disclosure.

FIG. 8 is a diagram for describing the plurality of electronic devices communicating with the server according to an embodiment of the present disclosure.

Referring to FIG. 8, each of the plurality of electronic devices 10, 20, 30, 40, 50, and 60 in the home may communicate with the server 200.

For example, while each of the plurality of electronic devices 10, 20, 30, 40, 50, and 60 is operated in the general mode, each of the plurality of electronic devices 10, 20, 30, 40, 50, and 60 may communicate with the server 200 to receive the time information including at least one of the time associated with the low power mode or the time associated with the general mode.

For the convenience of description, FIG. 8 assumes that each of the plurality of electronic devices 10, 20, 30, 40, 50, and 60 is operated in the general mode from 06:00 to 24:00. The present disclosure is not limited thereto, and the time associated with the general mode (or the time associated with the low power mode) corresponding to each of the plurality of electronic devices 10, 20, 30, 40, 50, and 60 may vary.

For example, the first electronic device 10 among the plurality of electronic devices 10, 20, 30, 40, 50, and 60 may communicate with the server 200 to receive the time associated with the low power mode.

According to an embodiment, the user terminal device may set the time information (at least one of the time associated with the low power mode or the time associated with the general mode) of each of the plurality of electronic devices 10, 20, 30, 40, 50, and 60 by using the server 200 based on the user setting, and the server 200 may transmit the time information corresponding to each of the plurality of electronic devices 10, 20, 30, 40, 50, and 60.

For example, if the time associated with the low power mode of the first electronic device 10 is set to 08:00 to 13:00 by using the user terminal device based on the user setting, the server 200 may transmit the time associated with the low power mode of the first electronic device 10 to the first electronic device 10.

According to an embodiment, the first electronic device 10 may receive the time associated with the low power mode from the server 200 and the first processor 131 of the first electronic device 10 may then control the sub-power supply 112 to provide power to the second processor 132 if the time associated with the low power mode arrives.

As another example, if the time associated with the general mode of the second electronic device 20 is set to 18:00 to 22:00 by using the user terminal device based on the user setting, the server 200 may transmit the time associated with the general mode of the second electronic device 20 to the second electronic device 20.

According to an embodiment, the second electronic device 20 may receive the time associated with the general mode from the server 200, and the second processor 132 of the second electronic device 20 may then control the main power supply 111 to provide power to the first processor 131 if the time associated with the general mode arrives.

As yet another example, the server 200 may obtain the time information (e.g., the time associated with the low power mode or the time associated with the general mode) corresponding to each of the plurality of electronic devices 10, 20, 30, 40, 50, and 60 by using the user presence time in the home and the usage history information corresponding to each of the plurality of electronic devices 10, 20, 30, 40, 50, and 60.

For example, the server 200 may identify the user presence time (or absence time) based on the user terminal device of the user, and obtain the time information to operate each of the plurality of electronic devices 10, 20, 30, 40, 50, and 60 in the general mode during the user presence time.

For example, the server 200 may identify a user schedule based on the user terminal device of the user, and obtain the time information to operate each of the plurality of electronic devices 10, 20, 30, 40, 50, and 60 in the low power mode during prolonged user absence (e.g., travel or business trip).

For example, the server 200 may obtain the time information (e.g., the time associated with the general mode) to activate the RF communication module of the first electronic device 10 based on the usage history information corresponding to each of the plurality of electronic devices 10, 20, 30, 40, 50, and 60, to enable the first electronic device 10, which is mainly used by the user during a current time, to transmit and receive the RF signals (or to control the first electronic device by using an application installed on the user terminal device). In addition, the server 200 may obtain the time information (e.g., the time associated with the low power mode) to deactivate the RF communication modules of the remaining electronic devices (e.g., the second electronic device 20 to the sixth electronic device 60) that the user does not mainly use during the current time.

Figure 9:
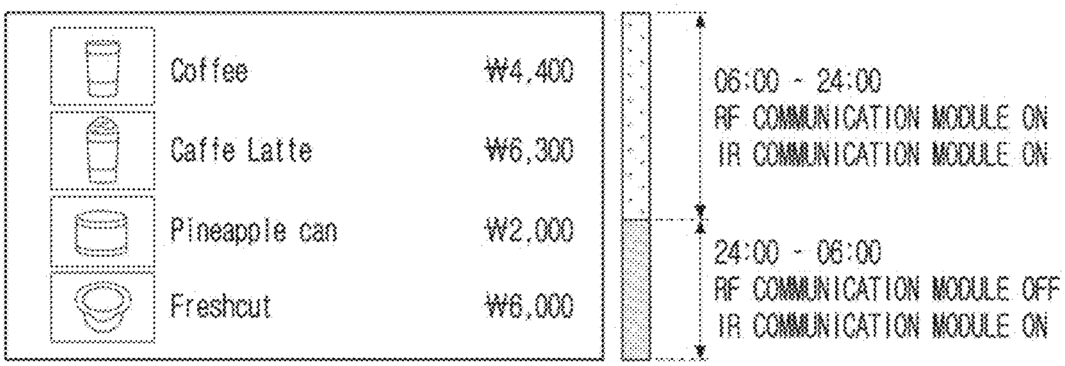
FIG. 9 is a diagram for describing an electronic paper display (e-paper display) according to an embodiment of the present disclosure.

FIG. 9 is a diagram for describing an electronic paper display (e-paper display) according to an embodiment of the present disclosure.

According to an embodiment, the electronic device 100 may further include the electronic paper display. According to an embodiment, the electronic paper display may include a display having characteristics similar to those of a paper printout and utilizing electronic ink (e-ink).

According to an embodiment, the electronic paper display may provide a screen by reflecting external light without a backlight. For example, the electronic paper display may be operated using low power because the electronic paper display provides the screen by using natural light rather than emitting light.

According to an embodiment, the electronic paper display may consume power only for refreshing the screen, and may continuously display the screen after refreshing the screen without additional power consumption. Due to these advantages, the electronic paper display may be used for e-books, price tags, menu boards, or the like.

According to an embodiment, the electronic device 100 including the electronic paper display may control the power supply 110 based on the time associated with the general mode for refreshing the screen (or the general mode in which power is provided to the electronic paper display) or the time associated with the low power in which no power is provided to the electronic paper display after the screen displayed by the electronic paper display is refreshed.

For example, the first processor 131 may communicate with the server 200 via the RF communication module 122 during the general mode and display a screen corresponding to data (or an image) received from the server on the electronic paper display.

According to an embodiment, the first processor 131 may control the power supply 110 to operate the electronic device 100 in the low power mode in which no power is provided to the electronic paper display if the screen is displayed on the electronic paper display.

For example, the first processor 131 may control the power supply 110 to provide power from the sub-power supply 112 to the second processor 132 and to block the supply of power from the main power supply 111 to the first processor 131.

Figure 10:
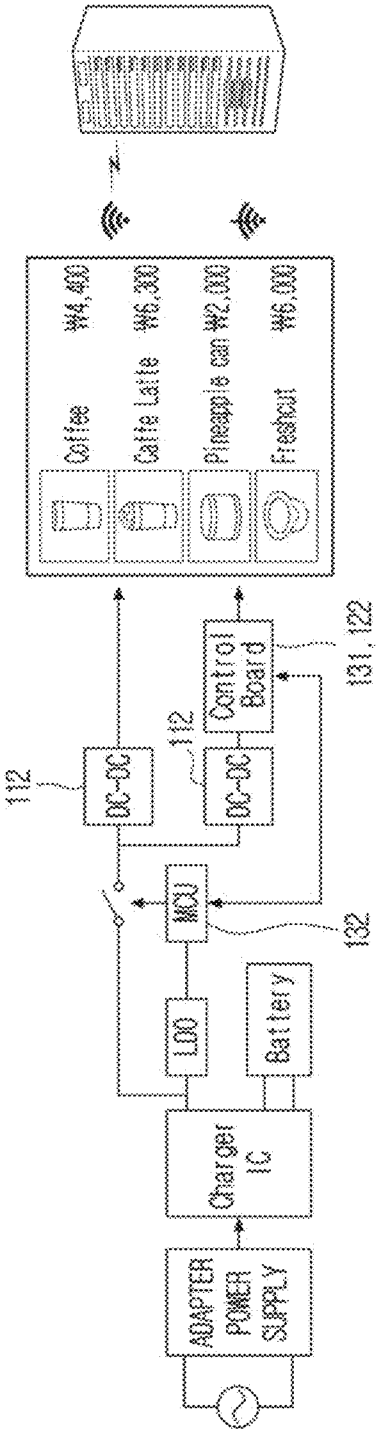
FIG. 10 is a circuit diagram for describing the electronic device including the electronic paper display according to an embodiment of the present disclosure.

FIG. 10 is a circuit diagram for describing the electronic device including the electronic paper display according to an embodiment of the present disclosure.

Referring to FIG. 10, the second processor 132 may control the power supply 110 not to provide power to the electronic paper display, thereby minimizing standby power of the electronic device 100.

According to an embodiment, if the time associated with the general mode arrives, the second processor 132 may control the main power supply 111 to provide power to the control board, and the first processor 131 and the RF communication module 122, included in the control board, may be activated using power provided from the main power supply 111. In addition, the main power supply 111 may provide power to the electronic paper display.

According to an embodiment, the first processor 131 may communicate with the server 200 via the RF communication module 122 and receive the image from the server 200. According to an embodiment, the first processor 131 may control the electronic paper display to display the received image.

According to an embodiment, the first processor 131 may control the power supply 110 to provide power from the sub-power supply 112 to the second processor 132 and to block the supply of power from the main power supply 111 to the first processor 131 if the electronic paper display displays the image or if the time associated with the general mode elapses.

According to an embodiment, the time associated with the general mode may correspond to a time required for the electronic paper display to display the image by communicating with the server 200 and receiving the image, and may generally be a short time (e.g., less than 5 minutes). However, this configuration is an example for the convenience of description and the present disclosure is not limited thereto.

For example, the time associated with the general mode refers to a time at which the date changes (e.g., 24:00 to 01:00). The first processor 131 may display the image received via the RF communication module 122 on the electronic paper display at the time at which the date changes, block the supply of power to the electronic paper display, and maintain the image being displayed on the electronic paper display for a day. However, this configuration is an example for the convenience of description, and depending on the user input, regardless of the time associated with the general mode or the time associated with the low power mode, the electronic device 100 may activate the RF communication module 122 to receive the image from the server 200 and control the electronic paper display to refresh the screen.

Figure 11:
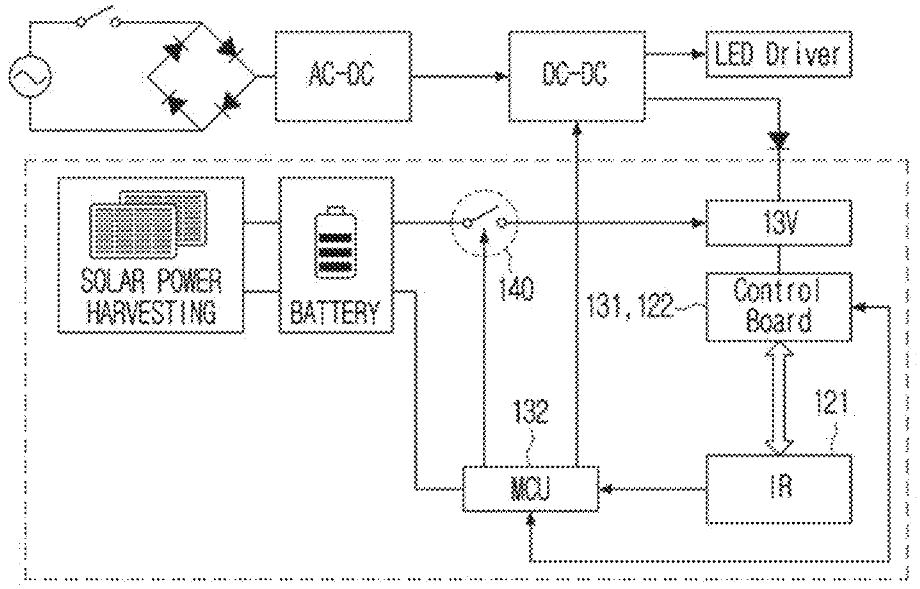
FIG. 11 is a diagram for describing the electronic device including the switch according to an embodiment of the present disclosure.

FIG. 11 is a diagram for describing the electronic device including the switch according to an embodiment of the present disclosure.

Referring to FIG. 11, the power supply 110 may include the switch 140. According to an embodiment, if the time associated with the low power mode elapses, the second processor 132 may turn on the switch 140 to control the power supply 110 to provide power from the sub-power supply 112 to the control board.

For example, even if the time associated with the low power mode elapses, the user may not use the electronic device 100, and power may be unnecessarily wasted if all the functions and all loads (e.g., the LED Driver) of the electronic device 100 are activated while the electronic device 100 is not in use.

According to an embodiment, even if the time associated with the low power mode elapses, the second processor 132 may control the power supply 110 to turn on the switch 140 and provide power from the sub-power supply 112 to the control board, rather than controlling the power supply 110 to provide power from the main power supply 111 to all the loads of the electronic device 100.

According to an embodiment, if the time associated with the low power mode elapses and the sub-power supply 112 then provides power to the control board, the RF communication module 122 may be activated although not all the loads of the electronic device 100 are activated. Accordingly, the electronic device 100 may transmit and receive the RF signals.

According to an embodiment, the second processor 132 may turn on the switch 140 to provide power from the sub-power supply 112 to the control board for the predetermined time (e.g., 2 hours) after the time associated with the low power mode elapses, and if the predetermined time elapses, turn off the switch 140 and activate the DC/DC block to provide power from the main power supply 111 to the control board.

According to an embodiment, if the control command is received from the remote control device via the IR communication module 121 or from the user terminal device (or the server 200 or the like) via the RF communication module 122, the second processor 132 may activate the DC/DC block to activate all the loads of the electronic device 100. For example, the control command may include various types of signals for activating the electronic device 100.

According to an embodiment, if the time associated with the low power mode elapses and then, if the remaining power of the sub-power supply 112 (e.g., the battery) is less than the threshold power while the sub-power supply 112 provides power to the control board, the second processor 132 may activate the DC/DC block to provide power from the main power supply 111 to the control board.

For example, the second processor 132 may activate the DC/DC block to provide power from the main power supply 111 to the control board if the remaining power of the battery is less than 20% of the total capacity of the battery (however, this threshold value is not limited to a specific number and may vary depending on an embodiment).

Figure 12:
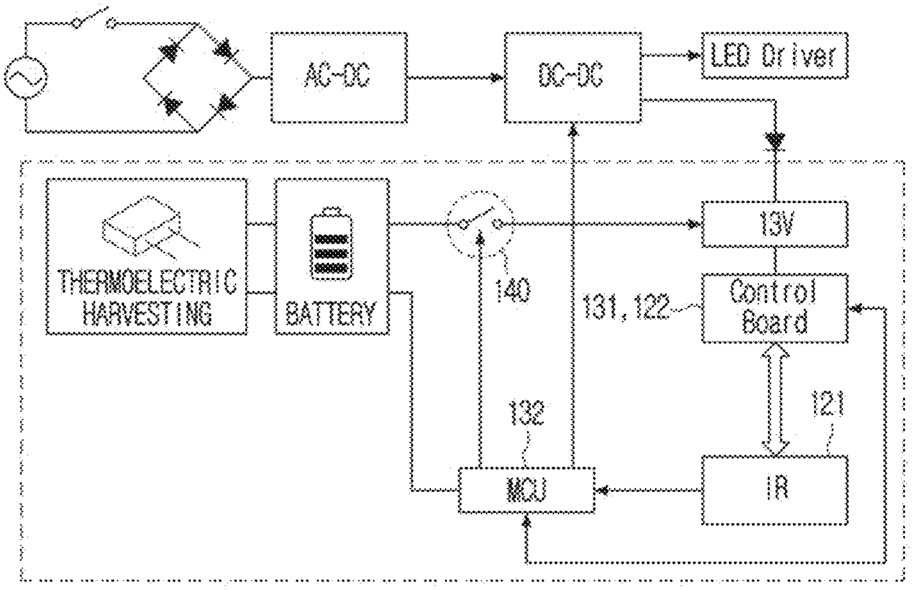
FIG. 12 is a diagram for describing the electronic device including the switch according to an embodiment of the present disclosure.

FIG. 12 is a diagram for describing the electronic device including the switch according to an embodiment of the present disclosure.

FIG. 12 is similar to FIG. 11. However, FIG. 12 assumes that the second sub-power supply includes the thermoelectric harvesting diode that harvests energy by utilizing heat generated during the operation of the electronic device 100.

Referring to FIG. 12, the second processor 132 may turn on the switch 140 to provide 13 V from the sub-power supply 112 to the control board based on the time information if the time associated with the low power mode elapses.

According to an embodiment, the second processor 132 may control the IR communication module 121 and the RF communication module 122, and may activate the DC/DC block to activate the electronic device 100 if the control command is received via at least one of the IR communication module 121 or the RF communication module 122. In addition, the second processor 132 may communicate with the external device or the server via the RF communication module 122 to transmit and receive the data.

Figure 13:
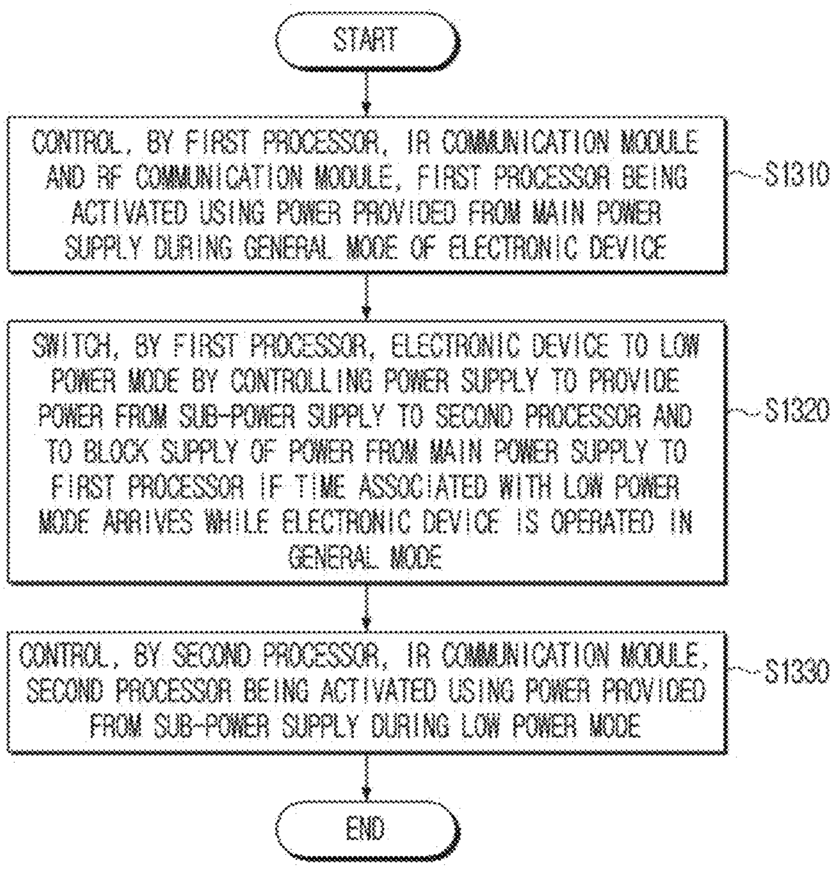
FIG. 13 is a flowchart for describing a control method of an electronic device according to an embodiment of the present disclosure.

FIG. 13 is a flowchart for describing a control method of an electronic device according to an embodiment of the present disclosure.

The control method of an electronic device according to an embodiment of the present disclosure may include controlling, by the first processor, the IR communication module and the RF communication module, the first processor being activated using power provided from the main power supply during the general mode of the electronic device (S1310).

The method may include switching, by the first processor, the electronic device to the low power mode by providing power output from the sub-power supply to the second processor and by blocking the supply of power from the main power supply to the first processor if the time associated with the low power mode arrives while the electronic device is operated in the general mode (S1320).

The method may include controlling, by the second processor, the IR communication module, the second processor being activated using power provided from the sub-power supply during the low power mode (S1330).

According to an embodiment, the switching of the electronic device to the low power mode (S1320) may include providing power output from the sub-power supply to the second processor if the time associated with the low power mode arrives, and transmitting the time information including the time associated with the low power mode to the second processor, and the controlling of the IR communication module (S1330) may include controlling, by the second processor, the IR communication module during the time associated with the low power mode based on the time information.

According to an embodiment, the control method may further include switching, by the second processor, the electronic device to the general mode by providing power output from the main power supply to the first processor and by blocking the supply of power from the sub-power supply to the second processor if the time associated with the low power mode elapses based on the time information.

According to an embodiment, the control method may further include switching the electronic device to the general mode by providing power output from the main power supply to the first processor if the control command is received via the IR communication module during the low power mode.

According to an embodiment, the main power supply may include the AC/DC block and the DC/DC block connected to the AC/DC block, and the switching of the electronic device to the general mode may include providing, by the second processor, power output from the main power supply to the first processor by activating the DC/DC block if the control command is received.

According to an embodiment, the first processor may be deactivated during the low power mode, and the second processor may be deactivated during the general mode.

According to an embodiment, the control method may further include obtaining the time information based on the user setting or obtaining the time information by inputting the usage history information of the electronic device into the neural network model. The neural network model may be a model trained to output the time information including the time associated with the low power mode based on the usage time of the electronic device included in the usage history information if the usage history information is input.

According to an embodiment, the sub-power supply may include the battery and the charging/discharging circuit that controls the charging/discharging of the battery, and the control method may further include controlling, by the first processor, the charging/discharging circuit to charge the battery by using power provided from the main power supply during the general mode of the electronic device, controlling, by the second processor, the charging/discharging circuit to provide power from the battery to the second processor during the low power mode of the electronic device, and controlling, by the second processor, the main power supply to provide power from the main power supply to the second processor if the remaining power of the battery is less than the threshold power.

According to an embodiment, the sub-power supply may include the thermoelectric harvesting diode, and the method may further include providing, by the thermoelectric harvesting diode during the low power mode, power harvested using heat generated by driving the electronic device during the general mode to the second processor.

According to an embodiment, the electronic device may further include the electronic paper display (e-paper display), and the method may further include controlling, by the first processor, the electronic paper display to display the image received via the RF communication module during the general mode, and switching the electronic device to the low power mode by controlling the power supply to provide power from the sub-power supply to the second processor and to block the supply of power from the main power supply to the first processor if the image is displayed on the electronic paper display.

However, the various embodiments of the present disclosure may be applied to various types of electronic devices, including the power supply, as well as the electronic device.

Meanwhile, the various embodiments described above may be implemented in a computer or a computer-readable recording medium using software, hardware, or a combination of software and hardware. In some cases, the embodiments described in the specification may be implemented by a processor itself. According to software implementation, the embodiments such as the procedures and functions described in the specification may be implemented by separate software modules. Each of the software modules may perform at least one function or operation described in the specification.

Meanwhile, computer instructions for performing processing operations of the electronic device according to the various embodiment of the present disclosure described above may be stored in a non-transitory computer-readable medium. The computer instructions stored in the non-transitory computer-readable medium may allow a specific device to perform the processing operations of the device according to the various embodiments described above in case that the computer instructions are executed by a processor of the specific device.

The non-transitory computer-readable medium is not a medium that temporarily stores data, such as a register, a cache, or a memory, and indicates a medium that semi-permanently stores data and is readable by the device. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although the embodiments of the present disclosure have been shown and described hereinabove, the present disclosure is not limited to the above-mentioned specific embodiments, and may be variously modified by those skilled in the art to which the present disclosure pertains without departing from the scope and spirit of the present disclosure as disclosed in the accompanying claims. These modifications should also be understood to fall within the scope and spirit of the present disclosure.

What is claimed is:

1. An electronic paper display device comprising:

a power supply including a main power supply and a sub-power supply;

an infrared (IR) communication module;

a radio frequency (RF) communication module;

a first processor; and a second processor, wherein the first processor is configured to:

control the IR communication module and the RF communication module during a general mode of the electronic paper display device, the first processor being activated by receiving power supplied by the main power supply during the general mode, and based on a first condition being satisfied during the general mode, switch the electronic paper display device from the general mode to a low power mode by controlling the power supply to supply power from the sub-power supply to the second processor and controlling the power supply to stop supply of power from the main power supply to deactivate the first processor and the RF communication module, and wherein the second processor is configured to:

control the IR communication module during the low power mode, the second processor being activated by receiving power supplied by the sub-power supply during the low power mode, and based on a second condition being satisfied during the low power mode, switch the electronic paper display device from the low power mode to the general mode by controlling the power supply to supply power to the first processor and the RF communication module.

2. The electronic paper display device of claim 1, wherein the first condition comprises an arrival of a time period associated with the low power mode, wherein the first processor is further configured to, based on the time period associated with the low power mode arriving, transmit time information including the time period associated with the low power mode to the second processor, and wherein the second processor is further configured to control the IR communication module during the time period associated with the low power mode based on the time information.

3. The electronic paper display device of claim 2, wherein the second condition comprises an elapse of the time period associated with the low power mode, and wherein the second processor is further configured to, based on the time period associated with the low power mode elapsing, switch the electronic paper display device from the low power mode to the general mode by controlling the power supply to supply power from the main power supply to the first processor and the RF communication module to activate the first processor and the RF communication module and to stop supply of power from the sub-power supply to the second processor to deactivate the second processor.

4. The electronic paper display device of claim 1, wherein the second condition comprises a control command being received via the IR communication module, and wherein the second processor is further configured to, based on the control command being received via the IR communication module during the low power mode, switch the electronic paper display device from the low power mode to the general mode by controlling the power supply to supply power from the main power supply to the first processor and the RF communication module to activate the first processor and the RF communication module.

5. The electronic paper display device of claim 4, wherein the main power supply comprises an alternating current to direct current (AC/DC) block and a direct current to direct current (DC/DC) block connected to the AC/DC block, and wherein the second processor is further configured to, based on the control command being received during the low power mode, switch the electronic paper display device from the low power mode to the general mode by activating the DC/DC block to supply power from the main power supply to the first processor and the RF communication module.

6. The electronic paper display device of claim 1, wherein the power supply is configured to:

during the general mode, supply power to the IR communication module and the RF communication module to activate the IR communication module and the RF communication module, and during the low power mode, supply power to the IR communication module to activate the IR communication module and stop supply of power to the RF communication module to deactivate the RF communication module, and wherein the second processor is further configured to, based on the second condition being satisfied during the low power mode, switch the electronic paper display device from the low power mode to the general mode by controlling the power supply to supply power to the first processor to activate the first processor and to stop supply of power to the second processor to deactivate the second processor.

7. The electronic paper display device of claim 1, wherein the first processor is further configured to obtain time information based on a user setting, or obtain the time information by inputting usage history information of the electronic paper display device into a neural network model, and wherein the neural network model is trained to output the time information including a time period associated with the low power mode based on a usage time of the electronic paper display device, included in the usage history information.

8. The electronic paper display device of claim 1, wherein the sub-power supply comprises a battery and a charging and discharging circuit configured to control charging and discharging of the battery, wherein the first processor is further configured to control the charging and discharging circuit to charge the battery by using power supplied by the main power supply during the general mode of the electronic paper display device, and wherein the second processor is configured to:

control the charging and discharging circuit to provide power supplied by the battery to the second processor during the low power mode of the electronic paper display device, and based on a remaining power of the battery being less than a threshold power, control the power supply to supply power from the main power supply to the second processor.

9. The electronic paper display device of claim 1, wherein the sub-power supply comprises a thermoelectric harvesting diode, and wherein the thermoelectric harvesting diode is configured to provide power harvested using heat generated by driving the electronic paper display device during the general mode to the second processor during the low power mode.

10. The electronic paper display device of claim 1, further comprising an electronic paper display, wherein the first processor is further configured to:

control the electronic paper display to display an image received via the RF communication module during the general mode, and based on the image being displayed on the electronic paper display, switch the electronic paper display device to the low power mode by controlling the power supply to supply power from the sub-power supply to the second processor and to block supply of power from the main power supply to the first processor.

11. A method controlling of an electronic paper display device, the method comprising:

controlling, by a first processor of the electronic paper display device, an infrared (IR) communication module and a radio frequency (RF) communication module of the electronic paper display device, the first processor being activated by receiving power supplied by a main power supply during a general mode of the electronic paper display device;

based on a first condition being satisfied during the general mode, switching, by the first processor, the electronic paper display device from the general mode to a low power mode by controlling a sub-power supply to supply power to a second processor of the electronic paper display device to activate the second processor and controlling the main power supply to stop supply of power from the main power supply to deactivate the first processor and the RF communication module;

controlling, by the second processor, the IR communication module during the low power mode, the second processor being activated by receiving power provided from the sub-power supply during the low power mode; and based on a second condition being satisfied during the low power mode, switching, by the second processor, the electronic paper display device from the low power mode to the general mode by supplying power to the first processor and the RF communication module.

12. The method of claim 11, wherein the first condition comprises an arrival of a time period associated with the low power mode, wherein the switching, by the first processor, the electronic paper display device from the general mode to the low power mode comprises transmitting time information including the time period associated with the low power mode to the second processor, and wherein the controlling, by the second processor, the IR communication module comprises controlling, by the second processor, the IR communication module during the time period associated with the low power mode based on the time information.

13. The method of claim 12, wherein the second condition comprises an elapse of the time period associated with the low power mode, and wherein the switching, by the second processor, the electronic paper display device from the low power mode to the general mode comprises, based on the time period associated with the low power mode elapsing, switching the electronic paper display device from the low power mode to the general mode by controlling the main power supply to supply power to the first processor and the RF communication module to activate the first processor and the RF communication module and stopping supply of power from the sub-power supply to the second processor to deactivate the second processor.

14. The method of claim 11, wherein the second condition comprises a control command being received via the IR communication module, and wherein the switching, by the second processor, the electronic paper display device from the low power mode to the general mode comprises, based on the control command being received via the IR communication module during the low power mode, switching the electronic paper display device from the low power mode to the general mode by controlling the main power supply to supply power to the first processor and the RF communication module to activate the first processor and the RF communication module.

15. The method of claim 14, wherein the main power supply comprises an alternating current to direct current (AC/DC) block and a direct current to direct current (DC/DC) block connected to the AC/DC block, and wherein the switching, by the second processor, the electronic paper display device from the low power mode to the general mode comprises switching the electronic paper display device from the low power mode to the general mode by activating the DC/DC block to supply power from the main power supply to the first processor and the RF communication module.

16. A non-transitory computer-readable recording medium storing a program that executed to perform a method of controlling an electronic paper display device, the method comprising:

controlling, by a first processor of the electronic paper display device, an infrared (IR) communication module and a radio frequency (RF) communication module of the electronic paper display device, the first processor being activated by receiving power supplied by a main power supply during a general mode of the electronic paper display device;

based on a first condition being satisfied during the general mode, switching, by the first processor, the electronic paper display device from the general mode to a low power mode by controlling a sub-power supply to supply power to a second processor of the electronic paper display device to activate the second processor and controlling the main power supply to stop supply of power from the main power supply to deactivate the first processor and the RF communication module during the low power mode;

controlling, by the second processor, the IR communication module during the low power mode, the second processor being activated by receiving power provided from the sub-power supply during the low power mode; and based on a second condition being satisfied during the low power mode, switching, by the second processor, the electronic paper display device from the low power mode to the general mode by supplying power to the first processor and the RF communication module.

17. The non-transitory computer-readable recording medium of claim 16, wherein the first condition comprises an arrival of a time period associated with the low power mode, wherein the switching, by the first processor, the electronic paper display device from the general mode to the low power mode comprises transmitting time information including the time period associated with the low power mode to the second processor, and wherein the controlling, by the second processor, the IR communication module comprises controlling, by the second processor, the IR communication module during the time period associated with the low power mode based on the time information.

18. The non-transitory computer-readable recording medium of claim 17, wherein the second condition comprises an elapse of the time period associated with the low power mode, and wherein the switching, by the second processor, the electronic paper display device from the low power mode to the general mode comprises, based on the time period associated with the low power mode elapsing, switching the electronic paper display device from the low power mode to the general mode by controlling the main power supply to supply power to the first processor and the RF communication module to activate the first processor and the RF communication module and stopping supply of power from the sub-power supply to the second processor to deactivate the second processor.

19. The non-transitory computer-readable recording medium of claim 16, wherein the second condition comprises a control command being received via the IR communication module, and wherein the switching, by the second processor, the electronic paper display device from the low power mode to the general mode comprises, based on the control command being received via the IR communication module during the low power mode, switching the electronic paper display device from the low power mode to the general mode by controlling the main power supply to supply power to the first processor and the RF communication module to activate the first processor and the RF communication module.

20. The non-transitory computer-readable recording medium of claim 19, wherein the main power supply comprises an alternating current to direct current (AC/DC) block and a direct current to direct current (DC/DC) block connected to the AC/DC block, and wherein the switching, by the second processor, the electronic paper display device from the low power mode to the general mode comprises switching the electronic paper display device from the low power mode to the general mode by activating the DC/DC block to supply power from the main power supply to the first processor and the RF communication module.

* * * * *